(12) United States Patent
Kushino (10) Patent No.: US 7,404,780 B2
(45) Date of Patent: Jul. 29, 2008

(54) TORQUE DISTRIBUTION-CONTROLLING APPARATUS

(75) Inventor: Hiroshi Kushino, Obu (JP)

(73) Assignee: JTEKT Corporation, Osaka (JP)

( * ) Notice: Subject to any disclaimer, the term of this patent is extended or adjusted under 35 U.S.C. 154(b) by 241 days.

(21) Appl. No.: 11/144,693

(22) Filed: Jun. 6, 2005

(65) Prior Publication Data

US 2005/0277511 A1 Dec. 15, 2005

(30) Foreign Application Priority Data

Jun. 10, 2004 (JP) ............................. 2004-172725

(51) Int. Cl.
*F16H 48/28* (2006.01)
(52) U.S. Cl. ...................... 475/252; 475/249
(58) Field of Classification Search ................... 475/18, 475/19, 248, 249, 252
See application file for complete search history.

(56) References Cited

U.S. PATENT DOCUMENTS 5,362,284 A * 11/1994 Brewer ........................ 475/249
6,120,407 A * 9/2000 Mimura ....................... 475/225
7,004,876 B2 * 2/2006 Puiu ............................ 475/205
2004/0020325 A1 * 2/2004 Krzesicki et al. ............. 74/650

FOREIGN PATENT DOCUMENTS

JP 07-025267 3/1995

* cited by examiner

*Primary Examiner*—Sherry Estremsky
*Assistant Examiner*—Edwin A Young
(74) *Attorney, Agent, or Firm*—Oblon, Spivak, McClelland, Maier & Neustadt, P.C.

(57) ABSTRACT

A torque distribution-controlling apparatus, by which a torque from a driving power source is distributed to vehicle right and left wheels via right and left axles, includes a differential having a first torque transmitting system and a second torque transmitting system, the first torque-transmitting system which transmits the torque from the driving power source to the vehicle right and left axles, and allows differentiation between these right and left axles, and the second torque-transmitting system which is structured to be symmetric to the first torque-transmitting system, transmits the torque from the driving power source to the right and left axles, and allows differentiation between these right and left axles; a left clutch controlling transmission of the torque from the first torque-transmitting system to the left axle; and a right clutch controlling transmission of the torque from the second torque-transmitting system to the right axle.

8 Claims, 6 Drawing Sheets

TORQUE DISTRIBUTION-CONTROLLING APPARATUS

CROSS REFERENCE TO RELATED APPLICATIONS

This application is based on and claims priority under 35 U.S.C. §119 with respect to Japanese Patent Application 2004-172725, filed on Jun. 10, 2004, the entire content of which is incorporated herein by reference.

FIELD OF THE INVENTION

This invention generally relates to a torque distribution-controlling apparatus according to which torque from a driving power source of a vehicle is distributed to right and left wheels via right and left axles of a vehicle.

BACKGROUND

A torque distribution-controlling apparatus has been conventionally known, the apparatus which actively controls, on the basis of a vehicle driving condition, distribution of torque to right and left axles of a vehicle. For example, according to a torque distribution-controlling apparatus, which is disclosed in an examined patent publication JP07-025267A, a pair of clutches are provided at an input side of this apparatus, in which one of the pair of clutches controls torque transmission to a left axle of a vehicle, while the other one of the pair of clutches controls torque transmission to a right axle of the vehicle. Herein, each clutch can be operated independently. Therefore, it is possible to adjust, on the basis of a vehicle driving condition, a degree of torque, which is to be transmitted to the left axle of the vehicle, and a degree of torque, which is to be transmitted to the right axle of the vehicle.

However, in this torque distribution-controlling apparatus described above, a dual shaft structure is employed at an output side of this apparatus, the structure in which two output shafts are provided for the purpose of obtaining torque which have been transmitted to the pair of clutches at the input side. Therefore, an engagement portion between a gear, which is provided for the output shaft of the one of the pair of clutches, and a gear, which is directly linked to the left axle, is displaced or deviated back and forth from a connecting portion between a gear, which is provided for the output shaft of the other one of the pair of clutches, and a gear, which is directly linked to the right axle. As a result, for example when a vehicle is turning, a vehicle behavior may on occasions become different between the vehicle right and left sides. Moreover, according to this dual shaft structure, a torque transmission control, which is performed by each clutch, may become complicated, wherein it is on occasions difficult to finely adjust a degree of torque, which is transmitted to the right and left axles of the vehicle, in response to a vehicle driving condition.

The present invention has been made in view of the above circumstances, and provides a torque distribution-controlling apparatus, according to which a driving force transmitting system for a right wheel of a vehicle is structured in a symmetric manner to a driving force transmitting system for a left wheel of a vehicle, and it is possible to finely control a distribution ratio of torque, which is distributed to the right and left wheels of a vehicle, in response to a vehicle driving condition.

SUMMARY OF THE INVENTION

According to an aspect of the present invention, a torque distribution-controlling apparatus, by which a torque from a driving power source of a vehicle is distributed to right and left wheels of the vehicle via right and left axles of the vehicle, includes:

a differential incorporating, therein, a first torque transmitting system and a second torque transmitting system, the first torque-transmitting system which transmits the torque from the driving power source to the right and left axles of the vehicle, and allows differentiation between these right and left axles, and the second torque-transmitting system which is structured to be symmetric to the first torque-transmitting system, transmits the torque from the driving power source to the right and left axles of the vehicle, and allows differentiation between these right and left axles;

a left clutch controlling transmission of the torque from the first torque-transmitting system to the left axle of the vehicle; and a right clutch controlling transmission of the torque from the second torque-transmitting system to the right axle of the vehicle.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings.

Figure 1:
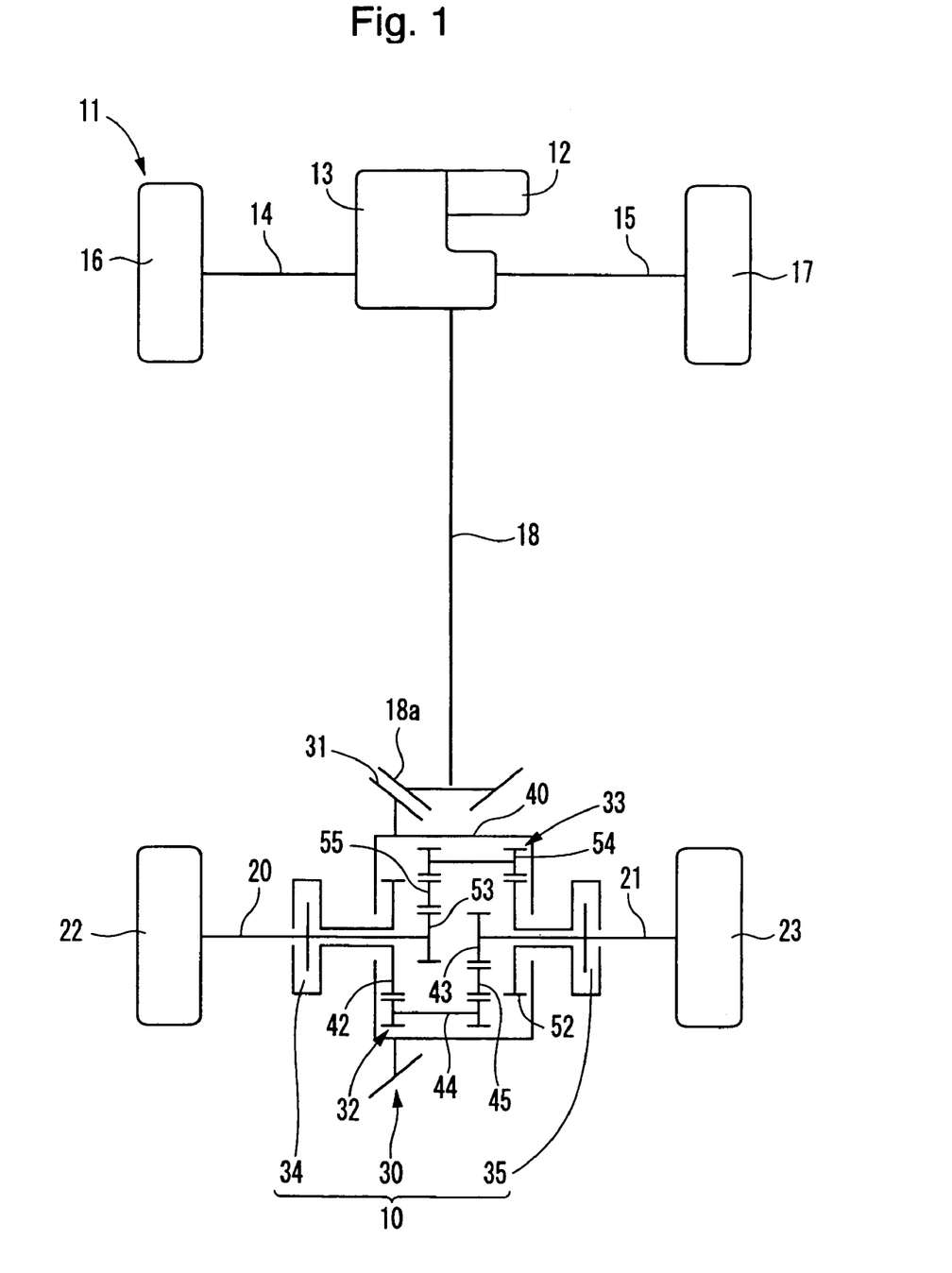
FIG. 1 is a view schematically illustrating a four-wheel drive vehicle on which a torque distribution-controlling apparatus according to an embodiment of the present invention is mounted.

With reference to FIG. 1, a four-wheel drive vehicle 11, on which a torque distribution-controlling apparatus 10 according to the embodiment of the present invention is mounted, is illustrated therein. In the four-wheel drive vehicle 11, torque outputted from a driving power source 12, such as an internal combustion engine and an electric motor, is transmitted, via a transaxle 13, to a front-left axle 14 of the vehicle 11 and to a front-right axle 15 thereof. A front-left wheel 16 and a front-right wheel 17, of the vehicle 11, are hence driven in response to this torque transmission. The torque outputted from the driving power source 12 is further transmitted to a rear-left axle 20 and a rear-right axle 21 sequentially via the transaxle 13, a propeller shaft 18 and the torque distribution-controlling apparatus 10. A rear-left wheel 22 and a rear-right wheel 23, of the vehicle 11, are hence driven in response to this torque transmission. A torque distribution ratio between to the front wheels 16, 17 and to the rear wheels 22, 23 is determined on the basis of an operation condition of the torque distribution-controlling apparatus 10. Likewise, a torque distribution ratio between the rear-left wheel 22 and the rear-right wheel 23 is determined on the basis of an operation condition of the torque distribution-controlling apparatus 10. In the four-wheel drive vehicle 11 according to the embodiment of the present invention, the front wheels 16 and 17 are employed as main drive wheels, while the rear wheels 22 and 23 are employed as auxiliary drive wheels. Therefore, when the torque distribution-controlling apparatus 10 is operated so as to control distribution of torque to the rear wheels 22 and 23, the four-wheel drive vehicle 11 is driven at a four-wheel drive mode. On the other hand, when the torque distribution-controlling apparatus 10 does not distribute torque to the rear wheels 22 and 23, the four-wheel drive vehicle 11 is driven at a two-wheel drive mode (FF mode).

The torque distribution-controlling apparatus 10 according to the embodiment of the present invention is provided with a differential 30, a left clutch 34 and a right clutch 35. In the differential 30, torque, which is transmitted to a ring gear 31 from the driving power source 12, is distributed, by use of two torque-transmitting systems 32 and 33, to the rear wheels 22 and 23 via the rear axles 20 and 21. These two torque-transmitting systems 32 and 33 are structured in a symmetric manner to each other.

The ring gear 31 of the differential 30 is arranged coaxially with the rear axles 20 and 21, and is engaged with a bevel gear 18a of the propeller shaft 18 which makes right angles with the rear axles 20 and 21. Moreover, the ring gear 31 is mounted on an outer periphery of a pinion carrier 40 which is shared by the two torque-transmitting systems 32 and 33, and is rotatable integrally with the pinion carrier 40. According to this structure, the torque transmitted to the ring gear 31 can hence be transmitted to the pinion carrier 40.

The first torque-transmitting system 32 and the second torque-transmitting system 33, of the differential 30, transmits the torque from the driving power source 12 to the rear axles 20 and 21. Moreover, the first and second torque-transmitting systems 32 and 33 allow and restrict differentiation which occurs between the rear-left wheel 20 and the rear-right wheel 21. Herein, differentiation represents a difference between a rotational speed of the rear-left wheel 22 and a rotational speed of the rear-right wheel 23, the difference which may occur for example when a vehicle is turning.

Figure 2:
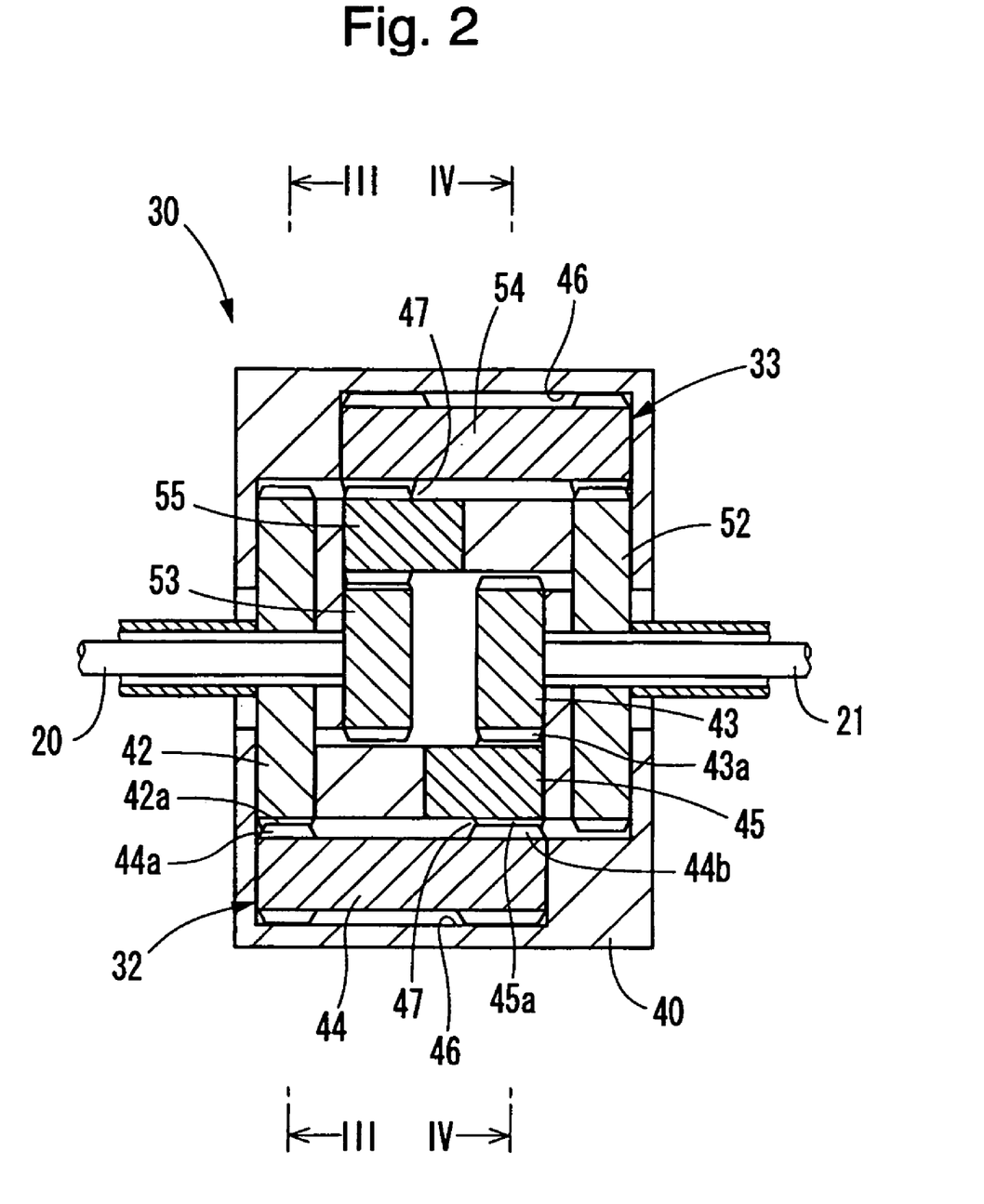
FIG. 2 is a view schematically illustrating an operation apparatus of the torque distribution-controlling apparatus according to the embodiment of the present invention.
Figure 3:
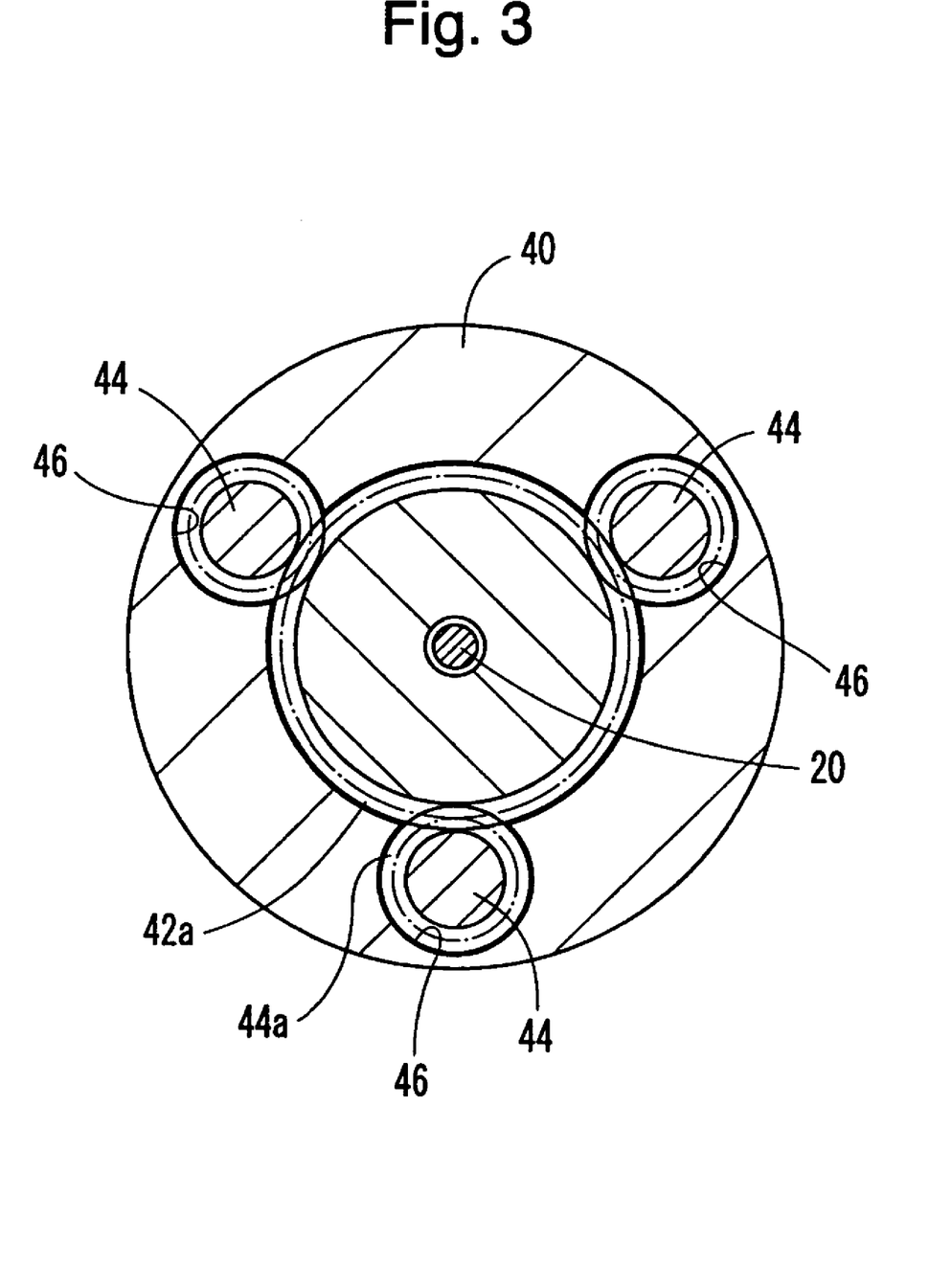
FIG. 3 is a sectional view taken along a line III-III in FIG. 2.
Figure 4:
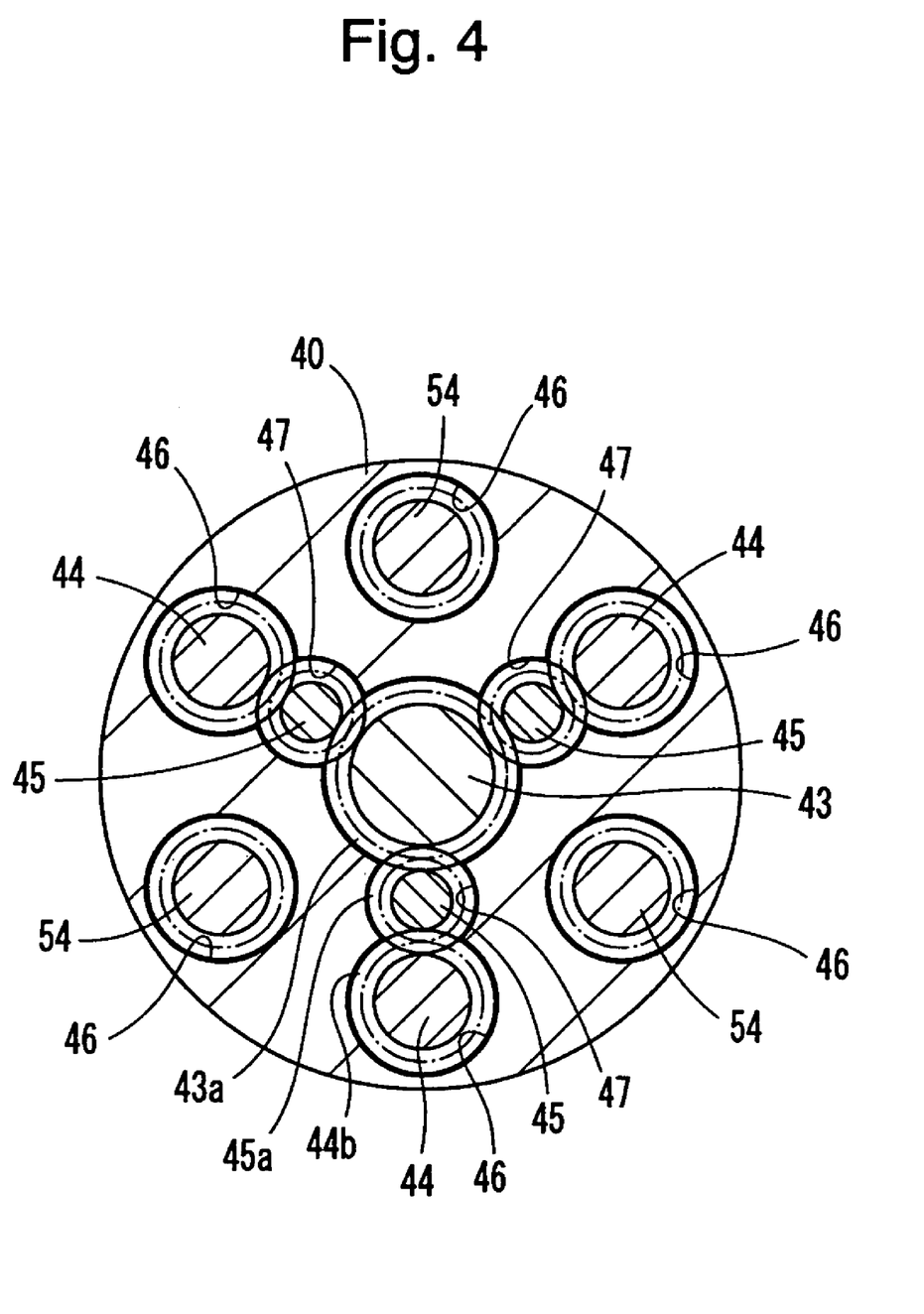
FIG. 4 is a sectional view taken along a line IV-IV in FIG. 2.

As is illustrated in FIGS. 2 to 4, the first torque-transmitting system 32 incorporates, therein, the pinion carrier 40, a first left side gear 42, a first right side gear 43, first left pinion gears 44, and first right pinion gears 45. The pinion carrier 40 possesses an approximately cylindrical structure, and is arranged coaxially with the rear axles 20 and 21. The first left side gear 42 and the first right side gear 43 are housed within the pinion carrier 40. The first left side gear 42 is arranged coaxially with the rear axles 20 and 21, and is linked to the rear-left axle 20 via the left clutch 34. The first right side gear 43 is arranged coaxially with the rear axles 20 and 21, and is linked to the rear-right axle 21. The first right side gear 43 is formed to possess a diameter which is inferior to a diameter of the first left side gear 42, and to possess the number of teeth which is smaller than the number of teeth of the first left side gear 42.

The first left pinion gears 44 are arranged in such a manner of being decentered or eccentric relative to the rear axles 20 and 21, and are supported, at an outer periphery thereof, by a supporting surface 46 of the pinion carrier 40. A helical gear 44a, which is integrally formed at an outer periphery at on end of the first left pinion gear 44, is engaged with a helical gear 42a, which is integrally formed at an outer periphery of the first left side gear 42. A spiral direction of the first left pinion gears 44 is hence reverse to a spiral direction of the first left side gear 42. Around the first left side gear 42, the first left pinion gears 44 are respectively rotatable on their axes, and are rotatable in an orbital manner coaxially with the rear axles 20 and 21. Accordingly, the first left pinion gears 44 are planetary gears, which rotate around the first left side gear 42.

The first right pinion gears 45 are arranged in such a manner of being decentered or eccentric relative to the rear axles 20 and 21, and are supported, at an outer periphery thereof, by a supporting surface 47 of the pinion carrier 40. In similar fashion as the first left pinion gears 44, the first right pinion gears 45 are supported by the pinion carrier 40, but the first right pinion gears 45 are supported by the pinion carrier 40 at a radially inner side relative to a position at which the first left pinion gears 44 are supported by the pinion carrier 40. A helical gear 45a, which is integrally formed at an outer periphery of each first right pinion gear 45 is engaged with a helical gear 43a, which is integrally formed at an outer periphery of the first right side gear 43. A spiral direction of the first right pinion gears 45 is hence reverse to a spiral direction of the first right side gear 43. Moreover, the helical gear 45a of each first right pinion gear 45 is also engaged with a helical gear 44b, which is integrally formed at an outer periphery of the other end of each first left pinion gear 44. Therefore, a spiral direction of each first right pinion gear 45 is reverse to a spiral direction of each first left pinion gear 44. Around the first right side gear 43, the first right pinion gears 45 are rotatable on their axes, and are rotatable in an orbital manner coaxially with the rear axles 20 and 21. Accordingly, the first right pinion gears 44 are planetary gears, which revolve around the first right side gear 43.

Figure 5:
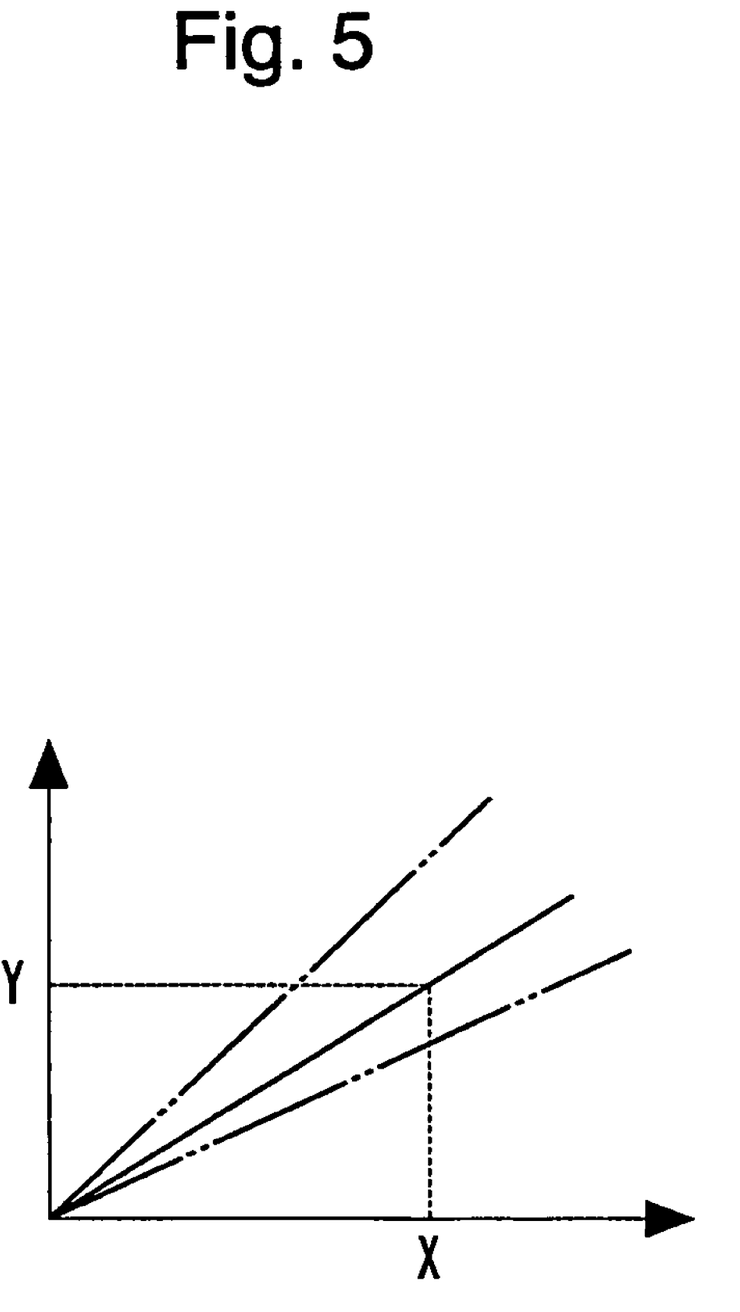
FIG. 5 is a diagram for explaining operation of the torque distribution-controlling apparatus according to the embodiment of the present invention.

At a time that a torque transmitting path is established, in response to engagement of the left clutch 34, between the first left side gear 42 and the rear-left axle 20, torque transmitted to the ring gear 31 is transmitted from the pinion carrier 40 to the first left pinion gears 44 and the first right pinion gears 45. The first left pinion gears 44 and the first right pinion gears 45 respectively hence revolve in an orbital manner. Therefore, as is illustrated with a solid line in FIG. 5, the first left side gear 42 and the right side gear 43 are transmitted with torque at a distribution ratio X:Y which corresponds to a radius ratio of the gears 42 and 43.

Figure 6:
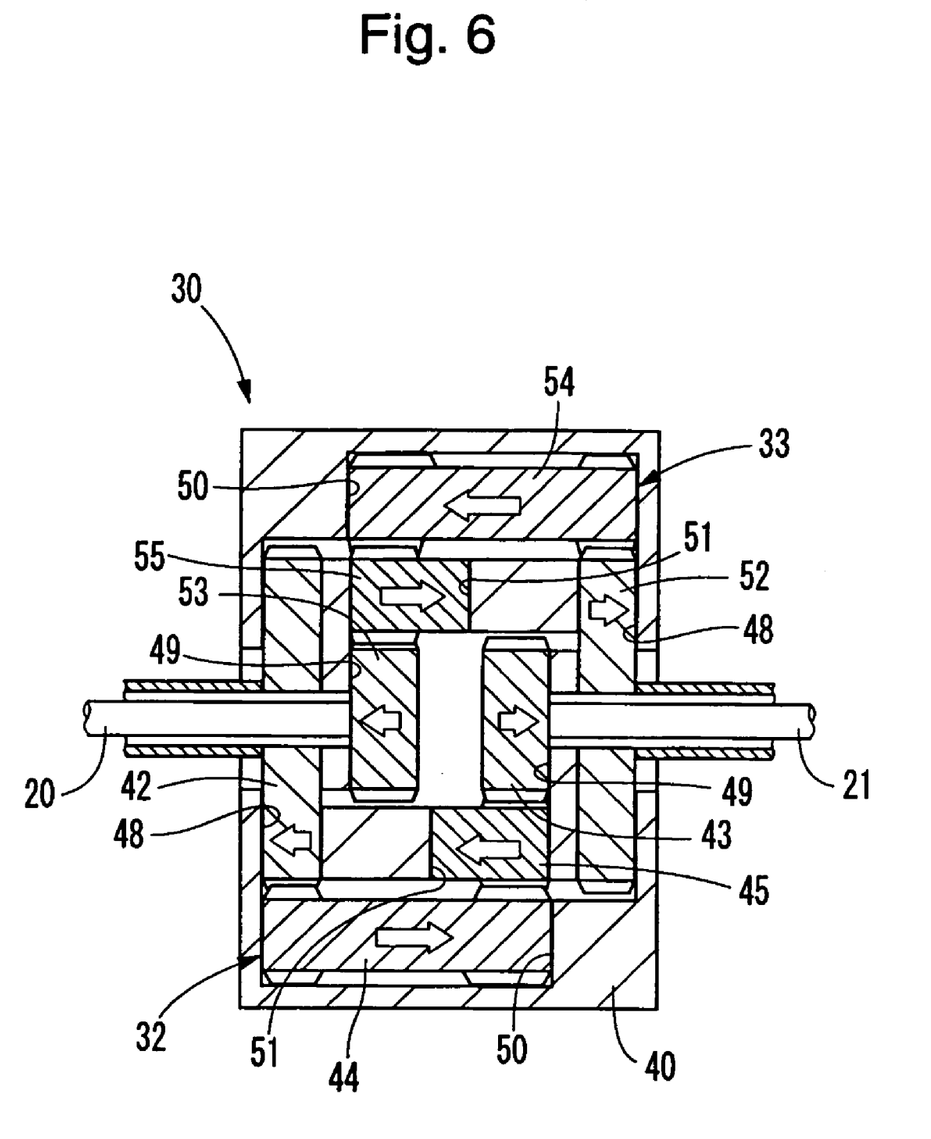
FIG. 6 is a view schematically illustrating operation of the torque distribution-controlling apparatus according to the embodiment of the present invention.

When differentiation occurs between the first left side gear 42 and the first right side gear 43 at a time that a torque transmission path is established, with the left clutch 34 engaged, between the first left side gear 42 and the rear-left axle 20, the first left pinion gears 44 and the first right pinion gears 45 respectively rotate on their axes. Each pinion gear 44 and 45 is hence applied with frictional resistance which is generated in response to a slidable movement thereof with each supporting surface 46 and 47, of the pinion carrier 40. In such circumstances, moreover, each gear 42, 43, 44 and 45 is applied with a thrust force in an axial direction thereof, as is illustrated with arrows in FIG. 6. Each gear 42, 43, 44 and 45 then slidably contacts with each friction surface 48, 49, 50 and 51 of the pinion carrier 40, and is applied with frictional resistance. As described above, because each gear 42, 43, 44 and 45 is applied with frictional resistance, differentiation between the first left side gear 42 and the first right side gear 43 can be effectively restricted from occurrence. Therefore, according to the embodiment of the present invention, it is possible to control a torque distribution ratio between the first left side gear 42 and the first right side gear 43, as is illustrated with a chain double-dashed line in FIG. 5. Herein, any frictional resistance described above varies in response to a degree of torque transmitted to the pinion carrier 40. The first torque-transmitting system 32 can be hence considered to possess a function for restricting, in response to a degree of transmitted torque, occurrences of differentiation. Therefore, it is possible to alter, in response to a vehicle driving condition, a degree of torque distributed to the right and left wheels.

As is illustrated in FIGS. 1 to 4, the second torque-transmitting system 33 incorporates, therein the pinion carrier 40, which is shared with the first torque-transmitting system 32, a second right side gear 52, a second left side gear 53, second right pinion gears 54, and second left pinion gears 55. The second torque-transmitting system 33 is structured in a symmetric manner to the first torque-transmitting system 32. The second right side gear 52 is structured substantially in the same manner as the first left side gear 42, apart from that the second right side gear 52 is linked to the rear-right axle 21 via the right clutch 35. The second left side gear 53 is structured substantially in the same manner as the first right side gear 43, apart from that the second left side gear 53 is directly linked to the rear-left axle 20. The second right pinion gears 54 and the second left pinion gears 55 are respectively structured in the same manner as the first left pinion gears 44 and the first right pinion gears 45. Therefore, detailed description of the second torque-transmitting system 33 is omitted herein.

Each the left clutch 34 and the right clutch 35 is a frictional clutch of which operation is controlled electromagnetically or hydraulically. Clutch torque of each the left clutch 34 and the right clutch 35 can be changed continuously or in a step manner. According to the embodiment of the present invention, as is illustrated in FIG. 1, each clutch 34 and 35 is illustrated like a single disc-type frictional clutch. However, each clutch 34 and 35 can be a multi disc-type clutch. The left clutch 34 is interposed between the rear-left axle 20 and the first left side gear 42 of the first torque-transmitting system 32, and controls transmission of torque from the first left side gear 42 to the rear-left axle 20. The right clutch 35 is interposed between the rear-right axle 21 and the second right side gear 52 of the second torque-transmitting system 33, and controls transmission of torque from the second right side gear 52 to the rear-right axle 21.

Next, described below is an operation of the torque distribution-controlling apparatus 10 at a time that a user selects a four-wheel drive mode.

(A) When a turning behavior of the four-wheel drive vehicle 11 is not detected by a turning behavior detecting means, such as a steering sensor and a yaw rate sensor, e.g., when the four-wheel drive vehicle 11 is moving straight, the right and left clutches 34 and 35 are both engaged. Torque can hence be transmitted from the side gears 42 and 52 to the rear axles 20 and 21. Therefore, to the rear-left axle 20, torque is transmitted to the pinion carrier 40, the first left pinion gears 44, and the first left side gear 42, which all are incorporated in the first torque-transmitting system 32, and also via the pinion carrier 40, the second left pinion gears 55 and the second left side gear 53, which all are incorporated in the second torque-transmitting system 33. To the rear-right axle 21, torque is transmitted via the pinion carrier 40, the first right pinion gears 45 and the first right side gears 43, which all are incorporated in the first torque-transmitting system 32, and also via the pinion carrier 40, the second right pinion gears 54 and the second right side gears 52, which all are incorporated in the second torque-transmitting system 33. In response to the above-described torque transmission, it is possible, while the differential 30 is restricting or locking differentiation between the rear-left axle 20 and the rear-right axle 21, to transmit torque to each rear axle 20 and 21 at a torque distribution ratio corresponding to clutch torque of each clutch 34 and 35. As a result, torque can be distributed to the rear wheels 22 and 23. The torque distribution ratio between the front wheels 16, 17 and the rear wheels 22, 23 can be determined on the basis of the clutch torque of each clutch 34 and 35.

(B) When a turning behavior of the four-wheel drive vehicle 11 in a right direction is detected by the turning behavior detecting means, the left clutch 34 is engaged. In this case, torque can be transmitted to the rear-left axle 20 from the first left side gear 42, and the right clutch 35 is disengaged so that a torque transmission path from the second right side gear 52 to the rear-right axle 21 is interrupted. In such circumstances, in the second torque-transmitting system 33, in which torque transmission to the rear-right axle 21 has been interrupted, torque can not be transmitted any more to the rear-left axle 20 via the pinion carrier 40, the second left pinion gears 55 and the second left side gear 53. Therefore, the first torque-transmitting system 32 transmits torque to the rear axles 20 and 21 at a torque distribution ratio which corresponds to a radius ratio between the side gears 42 and 43, and frictional resistance which is applied to each gear 42, 43, 44 and 45. Therefore, it is possible to unequally distribute torque to the rear-left wheel 22 and the rear-right wheel 23. The torque distribution ratio between the front wheels 16, 17 and the rear wheels 22, 23 can be determined on the basis of the clutch torque of the left clutch 34.

(C) When a turning behavior of the four-wheel drive vehicle 11 in a left direction is detected by the turning behavior detecting means, the right clutch 35 is engaged. In this case, torque can be transmitted to the rear-right axle 21 from the second right side gear 52, and the left clutch 34 is disengaged so that a torque transmission path from the second right side gear 52 to the rear-right axle 21 is interrupted. In such circumstances, as the same as the operation (B) described above, it is possible to unequally distribute torque to the rear-left wheel 22 and the rear-right wheel 23. The torque distribution ratio between the front wheels 16, 17 and the rear wheels 22, 23 can be determined on the basis of the clutch torque of the right clutch 35.

Next, described below is an example of operation when a user selects a two-wheel drive mode.

(D) In this case, the left clutch 34 and the right clutch 35 are both disengaged, wherein torque transmission to the rear axles 20 and 21 can be interrupted. Therefore, the axles 20, 21 and the wheels 22 and 23 are not transmitted with torque from any of the first and second torque-transmitting systems 32 and 33. As a result, torque from the driving power source 12 is transmitted only to the front wheels 16 and 17, wherein a two-wheel drive mode is established at the four-wheel drive vehicle 11.

According to the torque distribution-controlling apparatus 10 as described above, the first torque-transmitting system 32 is symmetric to the second torque-transmitting system 33. Therefore, by controlling, when an operation (A) is selected, degrees of clutch torques of the right and left clutches 34 and 35 to be substantially equal to each other, it is possible to simplify controlling operation of the clutches 34 and 35. Further, by controlling, at an identical condition, the clutch torque of the left clutch 34 at an event that an operation (B) is selected and the clutch torque of the right clutch 35 at an event that an operation (C) is selected to be substantially equal to each other, it is possible to simplify controlling operation of the clutches 34 and 35. Still further, when an operation (D) is selected, the left clutch 34 and the right clutch 35 are both disengaged. Therefore, controlling operation of the clutches 34 and 35 can be identical, and be simplified. Therefore, according to the embodiment of the present invention, controlling operation of the right and left clutches 34 and 35 i.e., torque transmission to the rear axles 20 and 21 by use of the right and left clutches 34 and 35, can be identical and simplified. It is hence possible to finely control, in response to a driving condition of the four-wheel drive vehicle 11, torque to be distributed to the rear wheels 22 and 23.

Further, according to the torque distribution-controlling apparatus 10 according to the embodiment of the present invention, when the operation (A) is selected, torque is transmitted to the rear axles 20 and 21 while differentiation between the rear axles 20 and 21 is being restricted or locked. Therefore, when the operation (A) is selected, e.g., when the four-wheel drive vehicle 11 is moving straight, it is possible to achieve a stable vehicle driving, and is possible to improve a vehicle starting performance especially when the four-wheel drive vehicle 11 starts moving straight.

Still further, according to the torque distribution-controlling apparatus 10, when any of the operations (B) and (C) is selected, torque transmission to the rear axles 20 and 21 can be established by one of the first torque-transmitting system 32 and the second torque-transmitting system 33. In this case, the one of the systems 32 and 33 can unequally distribute torque to the rear axles 20, 21 and to the rear wheels 22, 34 while allowing and restricting differentiation between the rear axles 20 and 21, thereby enabling to improve a turning performance of the four-wheel drive vehicle 11. Moreover, it is possible to restrict, by use of frictional resistance, differentiation between these two axles 20 and 21, the frictional resistance which is generated between each pinion gear and the pinion carrier in response to rotation, of the first left pinion gears 44, of the first right pinion gears 45, of the second right pinion gears 54, and of the second left pinion gears 55, on their axes.

Still further, according to the torque distribution-controlling apparatus 10, when the operation (D) is selected, torque transmission to the rear wheels 22 and 23 is interrupted in response to disengagement of the clutches 34 and 35. Therefore, there is no need to mount an apparatus which is employed exclusively for the purpose of interrupting transmission of torque to the rear wheels 22 and 23, which both are the auxiliary drive wheels.

As described above, according to the embodiment of the present invention, the torque distribution-controlling apparatus 10 controls distribution of torque to the rear wheels 22 and 23 which are the auxiliary drive wheels of the four-wheel drive vehicle 11. However, the torque distribution-controlling apparatus 10 can be employed so as to control distribution of torque to front wheels, which are auxiliary drive wheels of a four-wheel drive vehicle.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A torque distribution-controlling apparatus by which a torque from a driving power source of a vehicle is distributed to right and left wheels of the vehicle via right and left axles of the vehicle comprising:
   a differential incorporating, therein, a first torque transmitting system and a second torque transmitting system, the first torque-transmitting system which transmits the torque from the driving power source to the right and left axles of the vehicle, and allows differentiation between these right and left axles, and the second torque-transmitting system which is structured to be symmetric to the first torque-transmitting system, transmits the torque from the driving power source to the right and left axles of the vehicle, and allows differentiation between these right and left axles;
   a left clutch controlling transmission of the torque from the first torque-transmitting system to the left axle of the vehicle; and
   a right clutch controlling transmission of the torque from the second torque-transmitting system to the right axle of the vehicle,
   wherein the first torque-transmitting system and the second torque-transmitting system possess means for restricting differentiation between the right axle and the left axle.

2. A torque distribution-controlling apparatus according to claim 1, wherein the first torque-transmitting system distributes a torque, which is greater than a torque that is distributed to the right axle, to the left axle, and the second torque transmitting system distributes a torque, which is greater than a torque that is distributed to the left axle, to the right axle.

3. A torque distribution-controlling apparatus according to claim 2, wherein the differential is provided with the first torque-transmitting system; the second torque-transmitting system; and a ring gear, the first torque-transmitting system which incorporates, therein, a first left side gear linked to the left axle via the left clutch; a first right side gear of which diameter is inferior to a diameter of the first left side gear; first left pinion gears which are engaged with the first left side gear and revolve in a planetary manner; first right pinion gears which are engaged with the first right side gear and the first left pinion gears and revolve in a planetary manner; and a pinion carrier which allows the first left pinion gears and the first right pinion gears to rotate on their axes and to revolve in an orbit manner coaxially with the left axle and the right axle, the second torque-transmitting system which incorporates, therein, a second right side gear linked to the right axle via the right clutch; a second left side gear of which diameter is inferior to a diameter of the second right side gear; second right pinion gears which are engaged with the second right side gear and revolve in a planetary manner; second left pinion gears which are engaged with the second left side gear and the second right pinion gears and revolve in a planetary manner; and the pinion carrier which is also employed by the first torque-transmitting system, and allows the second right pinion gears and the second left pinion gears to rotate on their axes and to revolve in an orbit manner coaxially with the left axle and the right axle, and the ring gear which is mounted at an outer periphery of the pinion carrier and transmits the torque from the driving power source to the pinion carrier.

4. A torque distribution-controlling apparatus by which a torque from a driving power source of a vehicle is distributed to right and left wheels of the vehicle via right and left axles of the vehicle comprising:
   a differential incorporating, therein, a first torque transmitting system and a second torque transmitting system, the first torque-transmitting system which transmits the torque from the driving power source to the right and left axles of the vehicle, and allows differentiation between these right and left axles, and the second torque-transmitting system which is structured to be symmetric to the first torque-transmitting system, transmits the torque from the driving power source to the right and left axles of the vehicle, and allows differentiation between these right and left axles;

a left clutch controlling transmission of the torque from the first torque-transmitting system to the left axle of the vehicle; and a right clutch controlling transmission of the torque from the second torque-transmitting system to the right axle of the vehicle, wherein the differential is provided with the first torque-transmitting system; the second torque-transmitting system; and a ring gear, the first torque-transmitting system which incorporates, therein, a first left side gear linked to the left axle via the left clutch; a first right side gear of which diameter is inferior to a diameter of the first left side gear; first left pinion gears which are engaged with the first left side gear and revolve in a planetary manner; first right pinion gears which are engaged with the first right side gear and the first left pinion gears and revolve in a planetary manner; and a pinion carrier which allows the first left pinion gears and the first right pinion gears to rotate on their axes and to revolve in an orbit manner coaxially with the left axle and the right axle, the second torque-transmitting system which incorporates, therein, a second right side gear linked to the right axle via the right clutch; a second left side gear of which diameter is inferior to a diameter of the second right side gear; second right pinion gears which are engaged with the second right side gear and revolve in a planetary manner; second left pinion gears which are engaged with the second left side gear and the second right pinion gears and revolve in a planetary manner; and the pinion carrier which is also employed by the first torque-transmitting system, and allows the second right pinion gears and the second left pinion gears to rotate on their axes and to revolve in an orbit manner coaxially with the left axle and the right axle, and the ring gear which is mounted at an outer periphery of the pinion carrier and transmits the torque from the driving power source to the pinion carrier.

5. A torque distribution-controlling apparatus by which a torque from a driving power source of a vehicle is distributed to right and left wheels of the vehicle via right and left axles of the vehicle comprising:

a differential incorporating, therein, a first torque transmitting system and a second torque transmitting system, the first torque-transmitting system which transmits the torque from the driving power source to the right and left axles of the vehicle, and allows differentiation between these right and left axles, and the second torque-transmitting system which is structured to be symmetric to the first torque-transmitting system, transmits the torque from the driving power source to the right and left axles of the vehicle, and allows differentiation between these right and left axles;

a left clutch controlling transmission of the torque from the first torque-transmitting system to the left axle of the vehicle; and a right clutch controlling transmission of the torque from the second torque-transmitting system to the right axle of the vehicle, wherein, when the vehicle is moving straight, the left clutch and the right clutch are both engaged to establish torque transmission paths to the left axle and the right axle.

6. A torque distribution-controlling apparatus by which a torque from a driving power source of a vehicle is distributed to right and left wheels of the vehicle via right and left axles of the vehicle comprising:

a differential incorporating, therein, a first torque transmitting system and a second torque transmitting system, the first torque-transmitting system which transmits the torque from the driving power source to the right and left axles of the vehicle, and allows differentiation between these right and left axles, and the second torque-transmitting system which is structured to be symmetric to the first torque-transmitting system, transmits the torque from the driving power source to the right and left axles of the vehicle, and allows differentiation between these right and left axles;

a left clutch controlling transmission of the torque from the first torque-transmitting system to the left axle of the vehicle; and a right clutch controlling transmission of the torque from the second torque-transmitting system to the right axle of the vehicle, wherein, when the vehicle is turning, one of the right and left clutches is engaged to establish the torque transmission path to the corresponding axle, and the other one of the right and left clutches is disengaged to interrupt the torque transmission path to the corresponding axle.

7. A torque distribution-controlling apparatus by which a torque from a driving power source of a vehicle is distributed to right and left wheels of the vehicle via right and left axles of the vehicle comprising:

a differential incorporating, therein, a first torque transmitting system and a second torque transmitting system, the first torque-transmitting system which transmits the torque from the driving power source to the right and left axles of the vehicle, and allows differentiation between these right and left axles, and the second torque-transmitting system which is structured to be symmetric to the first torque-transmitting system, transmits the torque from the driving power source to the right and left axles of the vehicle, and allows differentiation between these right and left axles;

a left clutch controlling transmission of the torque from the first torque-transmitting system to the left axle of the vehicle; and a right clutch controlling transmission of the torque from the second torque-transmitting system to the right axle of the vehicle, wherein the vehicle, on which the torque distribution-controlling apparatus is mounted, is a four-wheel drive vehicle which drives distributing torque to at least one main drive wheel and auxiliary drive wheels which are the right and left wheels, and wherein the left clutch and the right clutch are both disengaged to interrupt the torque transmission paths when the four-wheel drive vehicle drives at a two-wheel drive mode.

8. A torque distribution-controlling apparatus according to claim 7, wherein the at least one main drive wheel is a front wheel, and the auxiliary drive wheels are rear wheels.

* * * * *